United States Patent
He et al.

(10) Patent No.: US 7,613,720 B2
(45) Date of Patent: Nov. 3, 2009

(54) SELECTIVELY REMOVING ENTITIES FROM A USER INTERFACE DISPLAYING NETWORK ENTITIES

(75) Inventors: Zhengwen He, Rochester, MN (US); David Lynn Merbach, Rochester, MN (US); William Roy Yonker, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 316 days.

(21) Appl. No.: 11/007,361

(22) Filed: Dec. 7, 2004

(65) Prior Publication Data

US 2006/0122980 A1   Jun. 8, 2006

(51) Int. Cl.
*G06F 17/30* (2006.01)
(52) U.S. Cl. .......................................... 707/102; 707/3
(58) Field of Classification Search ................. 709/224; 714/6; 707/102, 3
See application file for complete search history.

(56) References Cited

U.S. PATENT DOCUMENTS

| | | | |
|---|---|---|---|
| 6,141,664 A | 10/2000 | Boothby | |
| 6,377,964 B1 | 4/2002 | Sano | |
| 6,442,533 B1 | 8/2002 | Hinkle | |
| 6,532,480 B1 | 3/2003 | Boothby | |
| 6,598,174 B1* | 7/2003 | Parks et al. ..................... | 714/6 |
| 6,697,924 B2 | 2/2004 | Swank | |
| 2003/0046421 A1* | 3/2003 | Horvitz et al. .............. | 709/238 |
| 2003/0050930 A1* | 3/2003 | Mosher et al. ................. | 707/9 |
| 2004/0139194 A1* | 7/2004 | Naganathan ................ | 709/224 |
| 2004/0216109 A1* | 10/2004 | Bhogi et al. ................ | 718/101 |

(Continued)

FOREIGN PATENT DOCUMENTS

CN   1642129 A   7/2005

(Continued)

OTHER PUBLICATIONS

Rabinovich, Michael et al., "A Fault-Tolerant Commit Protocol for Replicated Dabases", 11th Principles of Database Systems, Jun. 1992, San Diego,CA, p. 139-148, [onlie], Jun. 1992 [retrieved on Jan. 27, 2009]. Retrieved from the Internet:<URL:http://portal.acm.org/ft_gateway.cfm?id=137855&type=pdf&coll=GUIDE&dl=GUIDE&CFID=19878221&CFTOKEN=80511377>.*

(Continued)

*Primary Examiner*—Jean B. Fleurantin
*Assistant Examiner*—Dennis Myint
(74) *Attorney, Agent, or Firm*—David W. Victor; Konrad Raynes and Victor LLP

(57) ABSTRACT

Provided are a method, system, and program for selectively removing entities from a user interface displaying network entities. A discovery database includes information on at least one network, and, for each network, information on entities in the network and a status of the entities. A user interface display is generated indicating the entities in one network that are available and unavailable. User selection is received of at least one entity in the network that is displayed as unavailable, wherein at least one displayed unavailable entity is not selected. User selection is received to remove the selected at least one entity and the selected at least one entity and any underlying entities within the selected entity are removed in response to the user selection to remove the selected at least one entity.

24 Claims, 5 Drawing Sheets

U.S. PATENT DOCUMENTS

2005/0195109 A1* 9/2005 Davi et al. .................. 342/463

FOREIGN PATENT DOCUMENTS

EP          0926919 A2 *  6/1999

OTHER PUBLICATIONS

Ratanasamy, Sylvia et al., "Data-Centric Storage in Sensornets with GHT, a Geographic Hash Table", Mobile Networks and Applications 8, p. 427-442 [online] Aug. 2003 [retrieved on Jan. 27, 2009].

Retrieved from the Internet:<URL:http://portal.acm.org/ft_gateway.cfm?id=942355&type=pdf&coll=GUIDE&dl=GUIDE&CFID=19877900&CFTOKEN=99643332>.*

J. Mylopoulos, et al., "Building Knowledge Base Management Systems", The VLDB Journal 5, 1996, pp. 238-247.

S.R. Das, et al., "Adaptive Memory Management and Optimism Control in Time Warp", ACM Transactions on Modeling and Computer Simulation, vol. 7, No. 2, Apr. 1997, pp. 239-271.

Information on Art cited in Chinese Counterpart case IBM, dated Dec. 5, 2007, 1 pp.

* cited by examiner

SELECTIVELY REMOVING ENTITIES FROM A USER INTERFACE DISPLAYING NETWORK ENTITIES

BACKGROUND OF THE INVENTION

1. Field of the Invention

The present invention relates to a method, system, and program for selectively removing entities from a user interface displaying network entities.

2. Description of the Related Art

In a network computing environment, such as a Storage Area Network (SAN) having multiple hosts, switches, and storage systems, a manager system may gather information on the topology of the components in the SAN network. The manager system may then display a graphical user interface (GUI) showing the topology of the network components. After performing a discovery operation, certain previously detected components may be missing. The topology GUI would be updated to indicate those missing components as unavailable, such as by displaying those missing components in a different color or manner. The user may then use the GUI to delete the display of all the components displayed as missing.

SUMMARY provided are a method, system, and program for selectively removing entities from a user interface displaying network entities. A discovery database includes information on at least one network, and, for each network, information on entities in the network and a status of the entities. A user interface display is generated indicating the entities in one network that are available and unavailable. User selection is received of at least one entity in the network that is displayed as unavailable, wherein at least one displayed unavailable entity is not selected. User selection is received to remove the selected at least one entity and the selected at least one entity and any underlying entities within the selected entity are removed in response to the user selection to remove the selected at least one entity.

DETAILED DESCRIPTION

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
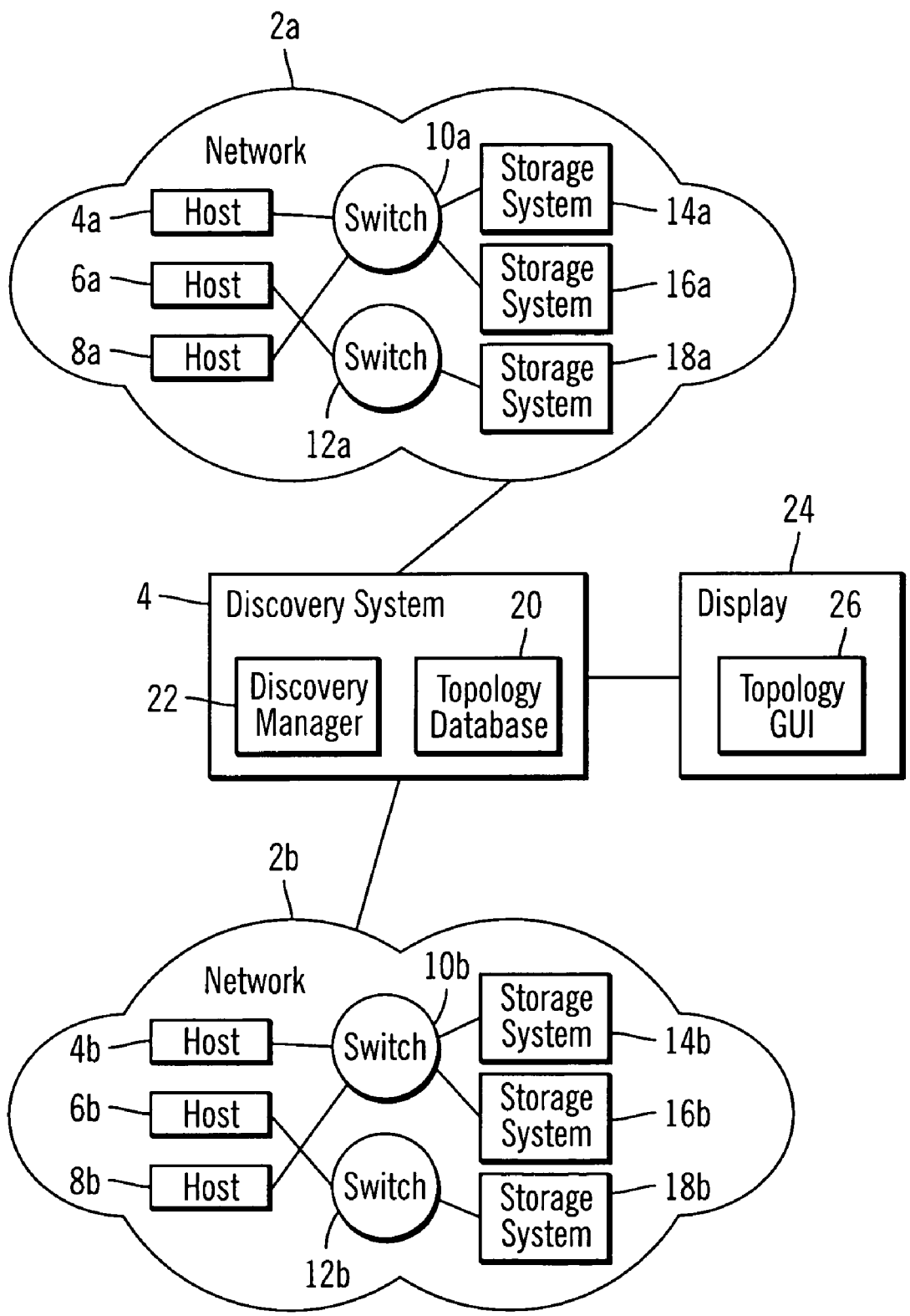
FIG. 1 illustrates an embodiment of a network computing environment.

FIG. 1 illustrates a network computing environment having a plurality of networks 2a and 2b and a discovery manager 4 system coupled to both networks 2a and 2b. Each network 2a, 2b includes a plurality of entities, including host machines 4a, 4b, 6a, 6b, 8a, 8b, switches 10a, 10b, 12a, 12b, and storage systems 14a, 14b, 16a, 16b, 18a, 18b. Hosts 4a, 4b, 6a, 6b, 8a, 8b may communicate with the storage systems 14a, 14b, 16a, 16b, 18a, 18b via the switches 10a, 10b, 12a, 12b, such as shown in FIG. 1. FIG. 1 provides one example of a network topology. However, there may be many different topology possibilities having different numbers of hosts, switches, storage systems, and other components in different topological arrangements. For instance, a host may communicate directly with a storage system. Further, there may be multiple switches between a host and a storage system.

The hosts 4a, 4b, 6a, 6b, 8a, 8b may comprise suitable computational devices known in the art, such as servers, desktop computers, workstations, mainframes, hand held computing devices, telephony devices, etc. The switches 10a, 10b, 12a, 12b may comprise suitable switches or hubs known in the art and the storage systems 14a, 14b, 16a, 16b, 18a, 18b may comprise any suitable storage device known in the art, such as a storage system including a plurality of storage devices, e.g., interconnected hard disk drives (a Redundant Array of Independent Disks (RAID), Just a bunch of Disks (JBOD), Direct Access Storage Device (DASD), disks connected in a loop configuration (serial loop, Fibre Channel Arbitrated loop), a tape library, an optical library, a network attached storage (NAS), etc. The storage systems 14a, 14b, 16a, 16b, 18a, 18b may include a control unit managing access to the storage media. The networks 2a, 2b may comprise networks known in the art, such as a Wide Area Network (WAN), local Area Network (LAN), Storage Area Network (SAN), wireless network, the Internet, and Intranet, etc.

A discovery system 4 is in communication with both networks 2a, 2b. The discovery system 4 has a topology database 20 providing topology information on all the discoverable entities in the networks 2a, 2b and a discovery manager 22 to gather topology information and render a topology graphical user interface (GUI) 26 on a display monitor 24 coupled to the discovery system 4. Gathered entity information may include information on underlying entities included in one larger entity. The discovery manager 22 may gather information on the entities, e.g., hosts 4a, 4b, 6a, 6b, 8a, 8b, switches 10a, 10b, 12a, 12b, storage systems 14a, 14b, 16a, 16b, 18a, 18b, etc., in the networks 2a, 2b through one of the switches 10a, 10b, 12a, 12b via a connection to the networks 2a, 2b. For instance, in an embodiment where the networks 2a, 2b comprise SAN networks, the discovery manager 22 connects through the SAN to the switches 10a, 10b, 12a, 12b to obtain the topology information from the switches 10a, 10b, 12a, 12b. The switches 10a, 10b, 12a, 12b may collect topology information as a result of devices registering with the switches. In an alternative embodiment, topology information on the entities in a network 2a, 2b may be gathered by agent programs (not shown) executing in the hosts 4a, 4b, 6a, 6b, 8a, 8b. The agent programs make queries over the networks to acquire the topology information. These agent programs may then communicate topology information to the discovery manager 22 through the network 2a, 2b or through an alternative network connection. For instance, if the networks 2a, 2b comprise SAN networks, then the agents may communicate topology information to the discovery system 4 via the SAN network 2a, 2b or through another network not used for data transfer operations between the hosts 4a, 4b, 6a, 6b, 8a, 8b and storage systems 14a, 14b, 16a, 16b, 18a, 18b, such as a LAN.

Figure 2:
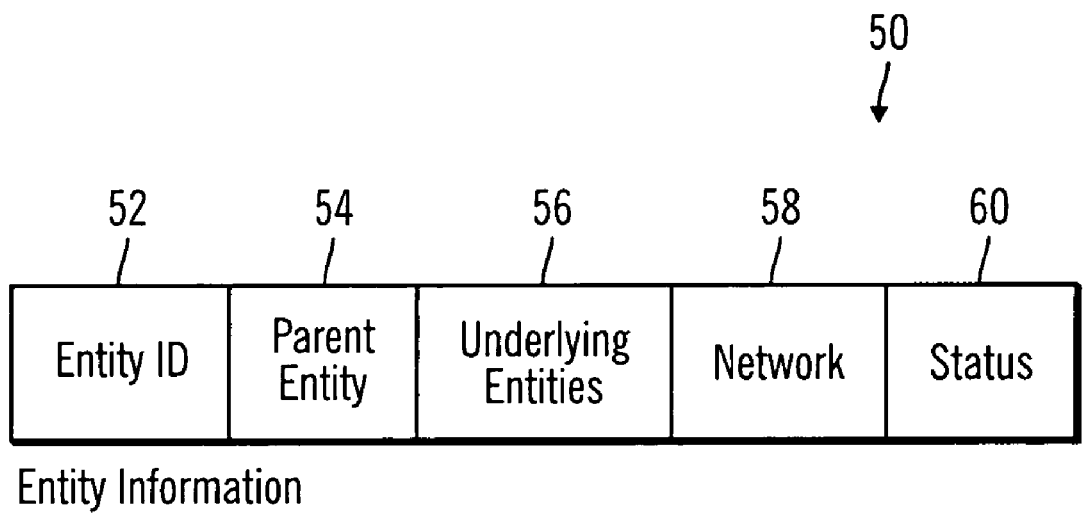
FIG. 2 illustrates an embodiment of entity information.

FIG. 2 illustrates an embodiment of entity information 50 maintained in the topology database 20 for each discovered entity, e.g., hosts, switches, storage systems, etc., in the networks 2a, 2b and underlying entities 56 (e.g., adaptors, file systems, ports, etc) of network component entities (e.g., hosts, storage systems, switches). The entity information 50 includes: an entity identifier (ID) 52, such as a name and/or world wide number; a parent entity 54 if the entity is an underlying entity (e.g., subcomponent, adaptor, file system, port, node, storage device, etc.) in a larger entity (e.g., host, switch, storage system); underlying entities 56 indicating subcomponents, such as adaptors, file systems, ports, nodes, etc., included in the identified entity; a network 58 in which the entity is included, e.g., 2a, 2b; and a status 60 of the entity, such as available, unavailable or partially available. The status 60 (FIG. 2) is marked as unavailable if there is entity information 50 in the topology database 20 for an entity and a recent discovery operation does not locate the entity and any underlying entity, e.g., subcomponent, of the entity, indicating that the previously identified entity is now missing or unavailable. The status 60 is marked partially unavailable if less than all the subcomponents or underlying entities within an entity are not located during the recent discovery operation. The status is marked as available if all the underlying entities, subcomponents, of an entity are determined to be available during the most recent discovery operation.

In one embodiment, there may be a separate database table for each network device type and relationship, such as a table for a network, network to switches, and switches. Further, an additional table may maintain state information of the network entities, such as normal or missing, and another table may be used to determine if the operation should be allowed for the currently highlighted item.

A network status is determined by the status of all the entity components of the network 2a, 2b, such as hosts, switches, and storage systems, which in turn is determined by the status of the underlying entities, subcomponents, of those components. Thus, a network is unavailable if all the host, switch, and storage system components of the network 2a, 2b are unavailable, partially unavailable if less than all the network components, such as hosts, switches, and storage systems, are unavailable, or available if all the network components are available.

Figure 3:
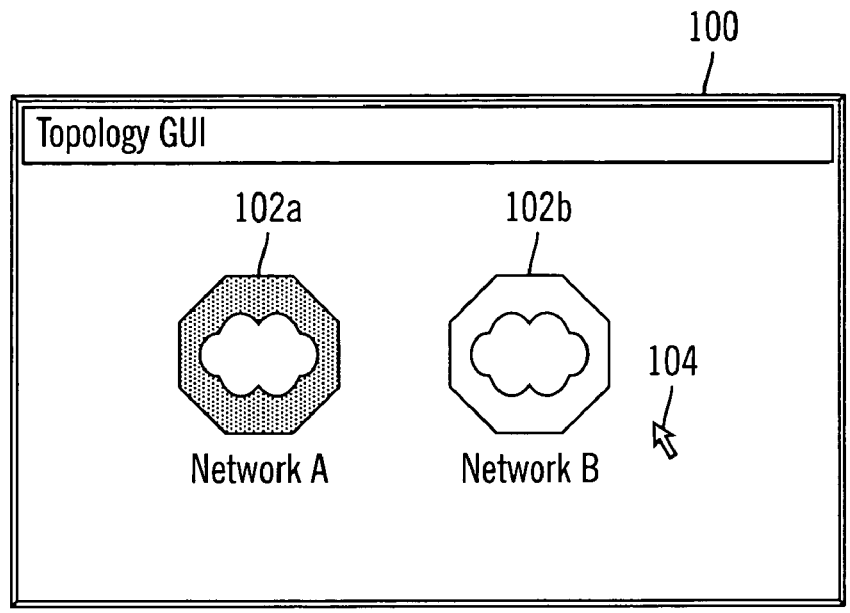
FIGS. 3 and 4 illustrate embodiments of a topology GUI.
Figure 4:
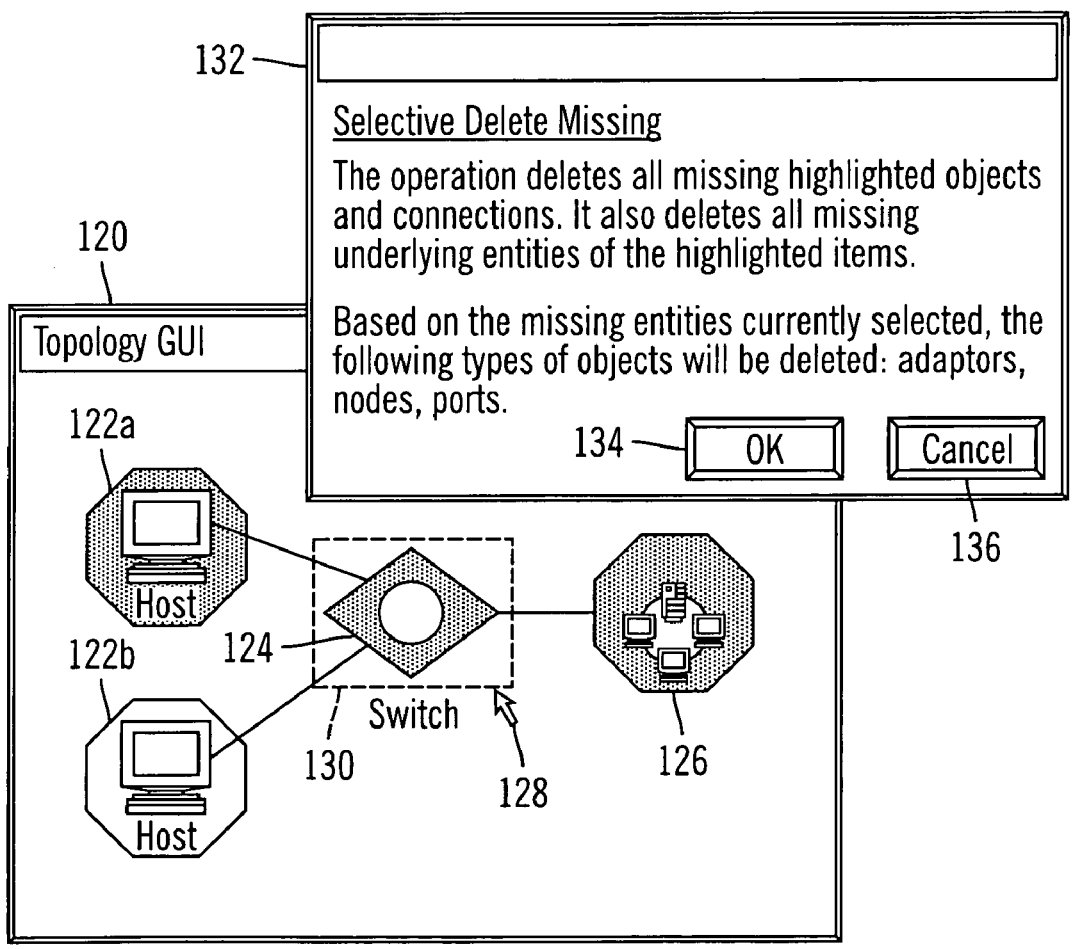

FIGS. 3 and 4 illustrate examples of an embodiment of the topology GUI 26 rendered in the display 24. FIG. 3 shows a Topology GUI 100 displaying icon representations of two networks 102a, 102b and a mouse pointer 104 that may be used to select one or both of the network representations 102a, 102b to perform GUI operations. The network representations 102a, 102b may be displayed in a different manner to indicate the status 60 of the represented network, e.g., 2a, 2b. For instance, in FIG. 3 the network representation 102a is displayed with a darker fill, which may indicate unavailability whereas a lighter fill such as the case with the network representation 102b may indicate the availability of the network. In additional embodiments, the icon representations may be displayed in different colors or with different graphical indicators to indicate and distinguish the status of the network as available, unavailable or partially unavailable.

FIG. 4 illustrates an embodiment of a topology GUI 120 of the components within one network 2a, 2b. The topology GUI 120 may be displayed in response to a user selecting to display the contents of one of the network representations 102a, 102b in the topology GUI 100 (FIG. 3), such as by selecting and double-clicking one network representation with the pointer 104. Topology GUI 120 displays representations of hosts 122a, 122b, a switch 124, and storage system 126 in the selected network. In one embodiment, those entity representations displayed with a darker filling, e.g., 122a, 124, and 126 are indicated as being unavailable and eligible for user selection to remove, whereas the entity representations displayed with a lighter filling, e.g., 122b, 126, are indicated as being available, and not eligible for selection to remove. An additional visual distinction may be used to indicate partially unavailable. The user may use the pointer 128 to select the switch 124, whose selection is indicated by the dotted line 130. The user may then select to remove the one or more selected unavailable entities. In one embodiment, the user may only select a representation of an entity to remove that is determined to be unavailable, i.e., all the underlying entities within the entity are determined to be unavailable.

Upon selecting to remove a selected entity, the discovery manager 22 may query the topology database 20 to determine all underlying entities, i.e., subcomponents, within the selected entity to remove and then display a window 132 informing the user that deletion of the selected entity, e.g., host, switch, storage system, will cause the removal of the noted underlying entities, e.g., adaptors, nodes, ports, file systems, storage devices, etc. The user may then select the "OK" button 134 to proceed with the removal or select "CANCEl" button 136 to abort the removal.

Figure 5:
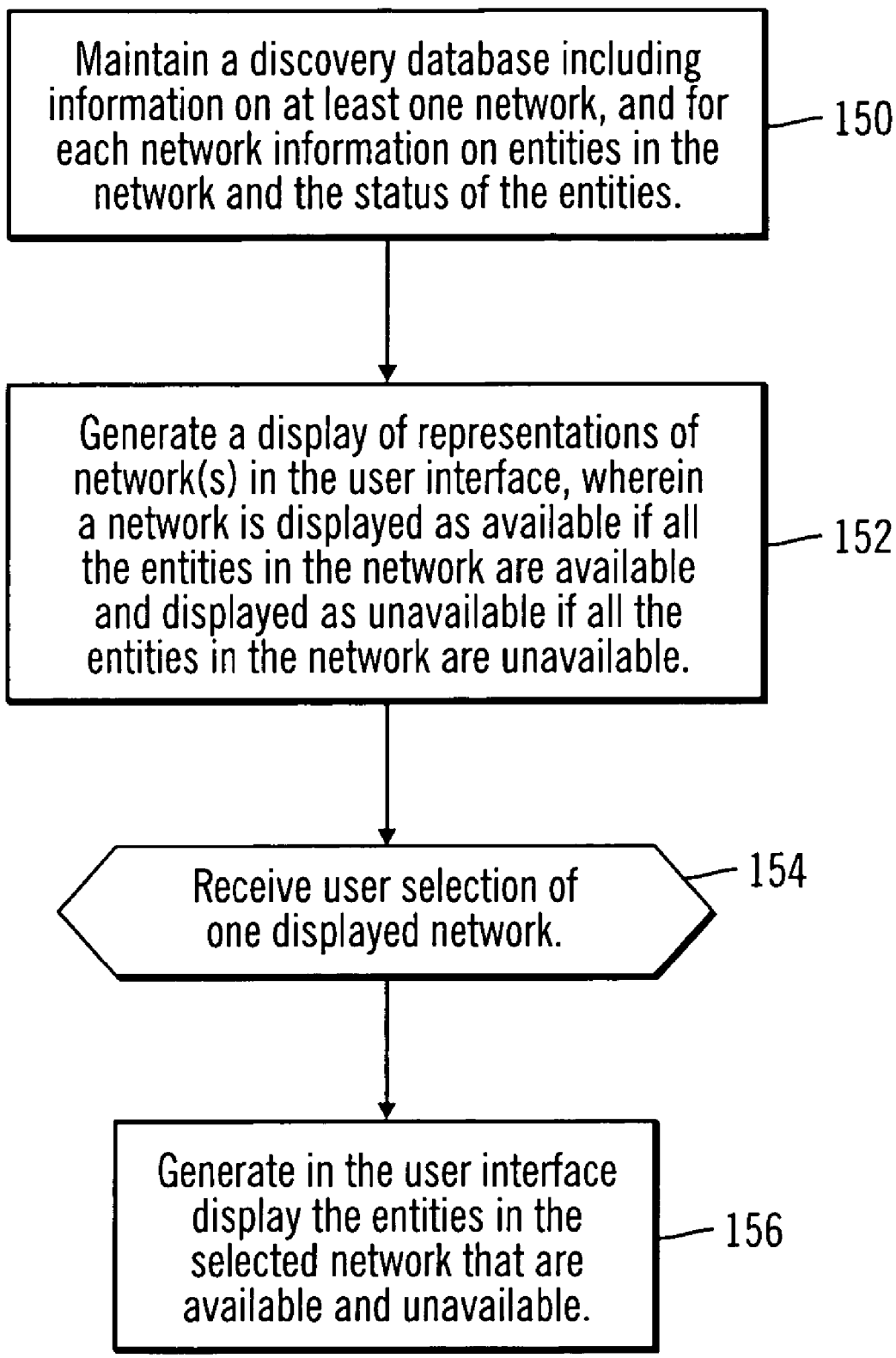
FIGS. 5 and 6 illustrate embodiments of operations to enable a user to view topology information and remove unavailable entities.

FIG. 5 illustrates an embodiment of operations performed by the discovery manager 22 to generate topology GUIs 26, such as topology GUIs 100, 120. The discovery manager 22 maintains (at block 150) the discovery database 20 including information on at least one network, and for each network information 50 (FIG. 2) on entities in the network and the status 60 of the entities. In response to user selection, the discovery manager 22 generates (at block 152) a display of representations of network(s) in the user interface, e.g., 100 (FIG. 3), where a network is displayed as available, e.g., 102b, if all the entities in the network and underlying entities 56 thereof (e.g., network components—hosts, storage systems, switches, etc.) are available and displayed as unavailable, e.g., 102a, if all the entities in the network and underlying entities 56 thereof (e.g., network components) are unavailable. A network representation may also be displayed to indicate partially unavailable. Upon receiving (at block 154) user selection of one displayed network, e.g., pointer 104 selects one displayed network 102a, 102b in topology GUI 100, the discovery manager 22 generates (at block 156) in the user interface display, e.g., 120 (FIG. 4), the entities in the selected network that are available and unavailable. The status of the entities in the selected network, e.g., available, partially unavailable or unavailable, may determine how the representation of the entity, e.g., host, storage system, switch, is displayed. The discovery manager 22 determines the status of all the underlying entities 56 of the displayed component entities, e.g., host, storage system, switch, etc., to determine how to display the representation of the entity. If underlying entities 56 themselves include underlying entities 56, then the status of underlying entities 56 is determined by the status of the further underlying entities thereof.

Figure 6:
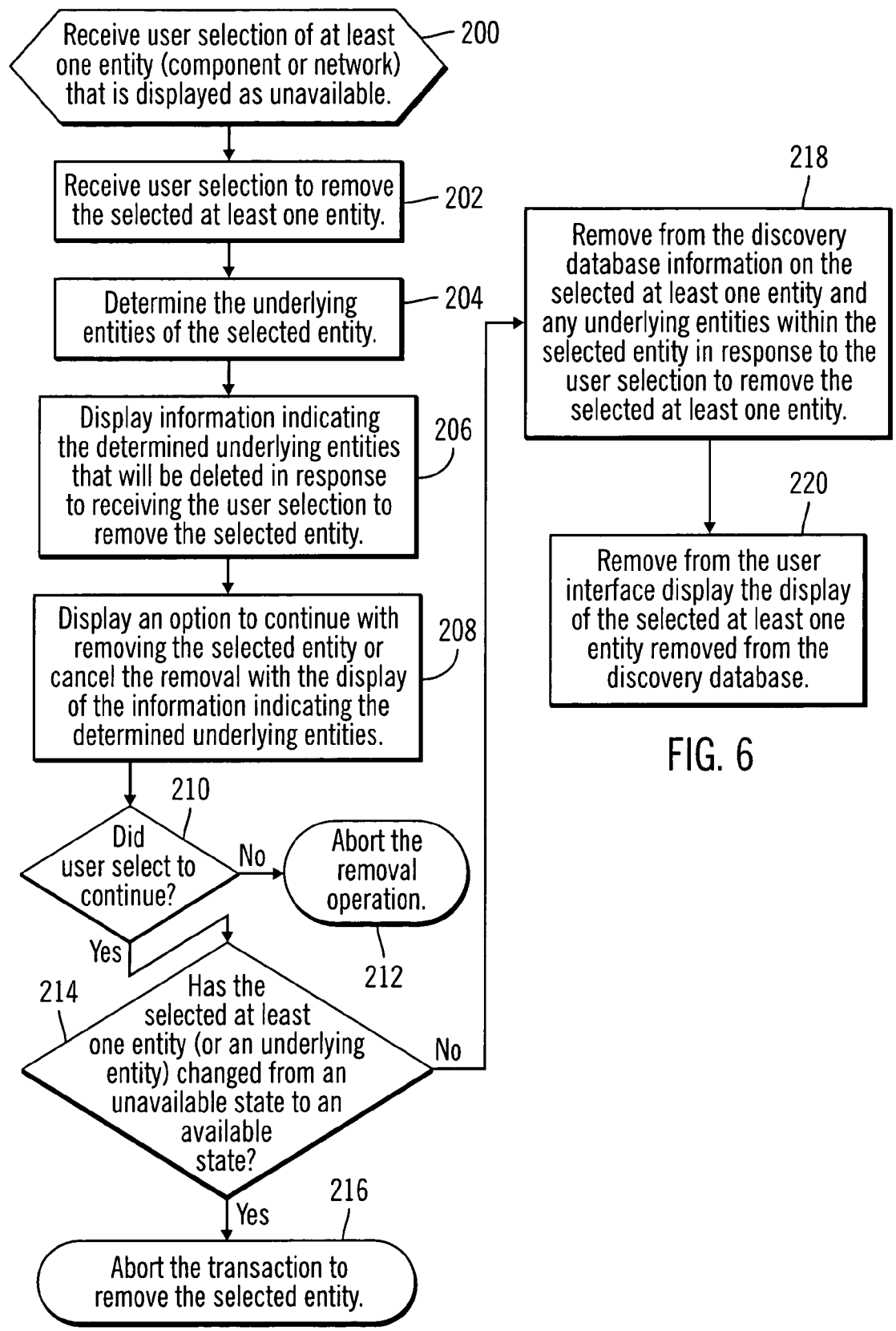

FIG. 6 illustrates an embodiment of operations performed by the discovery manager 22 to remove an entity, where the removed entity may comprise a network or network component, e.g., host, switch, storage system. Upon receiving (at block 200) user selection of at least one entity (component or network) that is displayed as unavailable and selection (at block 202) to remove the selected at least one entity, the discovery manager 22 determines (at block 204) the underlying entities 56 of the selected entities. The discovery manager 22 then displays (at block 206) information, e.g., window 132 (FIG. 4), indicating the determined underlying entities that will be deleted in response to the user remove operation. In the information window 132 (FIG. 4), the discovery manager 22 further displays (at block 208) an option to continue with removing the selected entity, e.g., the OK button 134 or cancel the removal, e.g., by selecting the cancel button 136. If (at block 210) the user selected to not continue, e.g., the cancel button 136, then the removal operation is aborted (at block 212) and the entities are displayed as unselected. Otherwise, if the user selects to continue, e.g., the OK button 134, then the discovery manager 22 determines (at block 214) whether the selected at least one entity has changed from an unavailable state to an available state since selection of the entity and the removal operation. An entity, e.g., network or network component (e.g., host, switch, storage system) changes state if any underlying entity within the selected entity changes its state from unavailable to available, making the selected entity, e.g., network or network component, available or partially unavailable. If one selected entity to remove has changed its state from unavailable to available or partially unavailable, then the transaction to remove the selected entity is aborted (at block 216). Otherwise, if there has been no change in the unavailable status of the selected entity and any underlying entities 56 (FIG. 2) thereof, then the discovery manager 22 removes (at block 218) from the discovery database 20 information on the selected at least one entity, e.g., corresponding entity information 50, and any underlying entities within the selected entity.

The operations of FIG. 6 may be performed with respect to enabling a user to remove a connection or path between entities, where the underlying entities of a selected connection would be all devices at the endpoints of the connection and in the connection path and the selected entity comprises the selected connection or path between entities, such as hosts, switches or storage systems.

The discovery manager 22 further removes (at block 220) from the user interface display, e.g., 100 (FIG. 3) or 120 (FIG. 4), the display of the selected at least one entity. Further, if the Topology GUI display 100, 120 included multiple displayed unavailable entities, e.g., networks or network components, then the entities shown as unavailable that were not selected for removal are still shown in the topology GUI 120. For instance, selection of removal of the unavailable switch 124 in the topology GUI 120 (FIG. 4) removes the display of the switch 124, but not the display of the unavailable host 122a.

In one embodiment, the operation to remove the entity information 50 from the discovery database 20 may involve issuing a precommit transaction to delete the entity information 50 for the selected unavailable entity and all underlying entities within the selected entity from the discovery database 20 before determining whether the selected entity and underlying entities have changed from an unavailable state to an available state. After determining that the selected entity and underlying entities have not changed state from unavailable to available or partially available, the discovery manager 22 issues a commit transaction to commit the delete of the selected entity and the underlying entities from the discovery database 20. An abort transaction is issued to reverse the changes made by the precommit transaction if at least one underlying entity in the selected entity has changed to the available or partially unavailable state.

Described embodiments enable the selective removal of networks and network components shown as unavailable in a topology GUI providing a display of the network or network components. The removal further removes information from the selected entity and all underlying entities within the selected entity from a topology database 20 providing information on the networks 2a, 2b. Yet further, selection and removal of one entity, e.g., network or network component, does not remove those unavailable entities not selected for removal from the topology GUI.

Additional Embodiment Details

The described operations may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

FIG. 2 provides an example of entity information that may be maintained in a topology database 20. In alternative embodiments, different information may be maintained or the information may be maintained in various database and data structure formats.

The topology GUIs 100 and 120 in FIGS. 3 and 4 provide examples of the networks and network components that may be displayed in the topology GUI 26. In additional embodiments, different graphical representations may be used to represent the various network components. Further, various graphical indicators may be used to indicate the status, e.g., available, unavailable, partially unavailable, such as the color of the represented component, graphics, etc.

The illustrated operations of FIGS. 5 and 6 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
   maintaining a discovery database including information on at least one network, and, for each network, information on entities in the network and a status of the entities;
   generating a user interface display indicating the entities in one network that are available and unavailable;
   receiving user selection of at least one entity in the network that is displayed as unavailable, wherein at least one displayed unavailable entity is not selected;
   receiving user selection to remove the selected at least one entity;
   determining whether the selected at least one entity that was displayed as unavailable when selected to remove has changed from an unavailable state to an available state in response to receiving user selection to remove the selected at least one unavailable entity;
   removing from the discovery database information on the selected at least one entity and any underlying entities within the selected entity in response to the user selection to remove the selected at least one entity and in response to determining that the at least one selected entity has not changed to the available state, wherein the information is removed by:
      issuing a precommit transaction to delete the selected unavailable entity and all underlying entities within the selected entity from the discovery database;
      determining whether the selected entity and underlying entities have changed from an unavailable state to an available state in response to the precommit transaction; and
      issuing a commit transaction to commit the delete of the selected entity and the underlying entities in response to determining that the selected entity and underlying entities remain in the unavailable state;
   issuing an abort transaction to reverse the precommit transaction and the remove operation for the at least one selected entity in response to determining that the at least one selected entity has changed from the unavailable state to the available state.

2. The method of claim 1, further comprising:
   removing from the user interface display the display of the selected at least one entity removed from the discovery database, wherein displayed unavailable entities not selected for removal remain displayed in the user interface after the removal of the selected entity.

3. The method of claim 1, wherein determining whether one selected entity has changed from the unavailable to the available state comprises determining whether at least one underlying entity within the selected unavailable entity has the available state.

4. The method of claim 1, further comprising:
   determining the underlying entities of the selected entity in response to receiving the user selection to remove the selected entity; and
   displaying information indicating the determined underlying entities that will be deleted in response to receiving the user selection to remove the selected entity.

5. The method of claim 4, further comprising:
   displaying an option to continue with removing the selected entity or cancel the removal with the display of the information indicating the determined underlying entities, wherein the information on the selected entity and underlying entities is removed in response to receiving user selection to continue.

6. The method of claim 1, wherein one displayed entity is enabled to be selected to remove in response to determining that all the underlying entities in the displayed entity are unavailable.

7. The method of claim 1, wherein the entity is a member of the set of network entities comprising a host, a switch, and a storage system, and wherein the underlying entities are members of a set of subcomponents of the network entity comprising adaptors, ports, and an operating system.

8. The method of claim 1, further comprising:
   generating a display of representations of networks in the user interface, wherein a network is displayed as available if all the entities in the network are available and displayed as unavailable if all the entities in the network are unavailable;
   receiving user selection of one network representation that is unavailable, wherein at least one displayed unavailable network representation is not selected;
   receiving user selection to remove the selected at least one network representation; and
   removing from the discovery database information on the selected at least one network and any underlying entities within the selected network in response to the user selection to remove the selected at least one network.

9. A system in communication with at least one network, wherein each network includes entities in the network, comprising:
   a processor;
   a computer readable storage medium;
   a discovery database including information on the at least one network, and for each network, information on the entities in the network and a status of the entities;
   a display device presenting a user interface display indicating the entities in one network that are available and unavailable;
   a program in the computer readable storage medium executed by the processor to perform operations, the operations comprising:
   receiving user selection of at least one entity in the network that is displayed as unavailable, wherein at least one displayed unavailable entity is not selected;
   receiving user selection to remove the selected at least one entity;
   determining whether the selected at least one entity that was displayed as unavailable when selected to remove has changed from an unavailable state to an available state in response to receiving user selection to remove the selected at least one unavailable entity;
   removing from the discovery database information on the selected at least one entity and any underlying entities within the selected entity in response to the user selection to remove the selected at least one entity and in response to determining that the at least one selected entity has not changed to the available state, wherein the information is removed by:
      issuing a precommit transaction to delete the selected unavailable entity and all underlying entities within the selected entity from the discovery database;
      determining whether the selected entity and underlying entities have changed from an unavailable state to an available state in response to the precommit transaction; and
      issuing a commit transaction to commit the delete of the selected entity and the underlying entities in response to determining that the selected entity and underlying entities remain in the unavailable state;

issuing an abort transaction to reverse the precommit transaction and the remove operation for the at least one selected entity in response to determining that the at least one selected entity has changed from the unavailable state to the available state.

10. The system of claim 9, wherein the operations further comprise:

removing from the user interface display the display of the selected at least one entity removed from the discovery database, wherein displayed unavailable entities not selected for removal remain displayed in the user interface after the removal of the selected entity.

11. The system of claim 9, wherein determining whether one selected entity has changed from the unavailable to the available state comprises determining whether at least one underlying entity within the selected unavailable entity has the available state.

12. The system of claim 9, wherein the operations further comprise:

determining the underlying entities of the selected entity in response to receiving the user selection to remove the selected entity; and displaying information indicating the determined underlying entities that will be deleted in response to receiving the user selection to remove the selected entity.

13. The system of claim 12, wherein the operations further comprise:

displaying an option to continue with removing the selected entity or cancel the removal with the display of the information indicating the determined underlying entities, wherein the information on the selected entity and underlying entities is removed in response to receiving user selection to continue.

14. The system of claim 9, wherein one displayed entity is enabled to be selected to remove in response to determining that all the underlying entities in the displayed entity are unavailable.

15. The system of claim 9, wherein the entity is a member of the set of network entities comprising a host, a switch, and a storage system, and wherein the underlying entities are members of a set of subcomponents of the network entity comprising adaptors, ports, and an operating system.

16. The system of claim 9, wherein the operations further comprise:

generating a display of representations of networks in the user interface, wherein a network is displayed as available if all the entities in the network are available and displayed as unavailable if all the entities in the network are unavailable;

receiving user selection of one network representation that is unavailable, wherein at least one displayed unavailable network representation is not selected;

receiving user selection to remove the selected at least one network representation; and removing from the discovery database information on the selected at least one network and any underlying entities within the selected network in response to the user selection to remove the selected at least one network.

17. An article of manufacture comprising a computer readable storage medium having code executed by a processor to communicate with at least one network, wherein each network includes entities in the network, and with a discovery database including information on at least one network, and, for each network, information on entities in the network and a status of the entities, wherein the code is further executed to perform operations, the operations comprising:

maintaining the discovery database including information on at least one network, and, for each network, information on entities in the network and a status of the entities;

generating a user interface display indicating the entities in one network that are available and unavailable;

receiving user selection of at least one entity in the network that is displayed as unavailable, wherein at least one displayed unavailable entity is not selected;

receiving user selection to remove the selected at least one entity;

determining whether the selected at least one entity that was displayed as unavailable when selected to remove has changed from an unavailable state to an available state in response to receiving user selection to remove the selected at least one unavailable entity;

removing from the discovery database information on the selected at least one entity and any underlying entities within the selected entity in response to the user selection to remove the selected at least one entity and in response to determining that the at least one selected entity has not changed to the available state, wherein the information is removed by:

issuing a precommit transaction to delete the selected unavailable entity and all underlying entities within the selected entity from the discovery database;

determining whether the selected entity and underlying entities have changed from an unavailable state to an available state in response to the precommit transaction; and issuing a commit transaction to commit the delete of the selected entity and the underlying entities in response to determining that the selected entity and underlying entities remain in the unavailable state;

issuing an abort transaction to reverse the precommit transaction and the remove operation for the at least one selected entity in response to determining that the at least one selected entity has changed from the unavailable state to the available state.

18. The article of manufacture of claim 17, wherein the operations further comprise:

removing from the user interface display the display of the selected at least one entity removed from the discovery database, wherein displayed unavailable entities not selected for removal remain displayed in the user interface after the removal of the selected entity.

19. The article of manufacture of claim 17, wherein determining whether one selected entity has changed from the unavailable to the available state comprises determining whether at least one underlying entity within the selected unavailable entity has the available state.

20. The article of manufacture of claim 17, further comprising:

determining the underlying entities of the selected entity in response to receiving the user selection to remove the selected entity; and displaying information indicating the determined underlying entities that will be deleted in response to receiving the user selection to remove the selected entity.

21. The article of manufacture of claim 20, further comprising:

displaying an option to continue with removing the selected entity or cancel the removal with the display of the information indicating the determined underlying entities, wherein the information on the selected entity and underlying entities is removed in response to receiving user selection to continue.

22. The article of manufacture of claim 17, wherein one displayed entity is enabled to be selected to remove in response to determining that all the underlying entities in the displayed entity are unavailable.

23. The article of manufacture of claim 17, wherein the entity is a member of the set of network entities comprising a host, a switch, and a storage system, and wherein the underlying entities are members of a set of subcomponents of the network entity comprising adaptors, ports, and an operating system.

24. The article of manufacture of claim 17, further comprising:

generating a display of representations of networks in the user interface, wherein a network is displayed as available if all the entities in the network are available and displayed as unavailable if all the entities in the network are unavailable;

receiving user selection of one network representation that is unavailable, wherein at least one displayed unavailable network representation is not selected;

receiving user selection to remove the selected at least one network representation; and removing from the discovery database information on the selected at least one network and any underlying entities within the selected network in response to the user selection to remove the selected at least one network.

* * * * *